April 20, 1965  R. G. TETRO  3,179,216
DIRECTIONAL DRIVE CONTROL FOR SYNCHRONOUS MOTOR
Filed March 27, 1963

*INVENTOR.*
ROLAND G. TETRO
BY
*Barlow + Barlow*
ATTORNEYS

United States Patent Office 3,179,216
Patented Apr. 20, 1965

3,179,216
DIRECTIONAL DRIVE CONTROL FOR
SYNCHRONOUS MOTOR
Roland George Tetro, 88 Vantana Drive, Bristol, Conn.
Filed Mar. 27, 1963, Ser. No. 268,303
4 Claims. (Cl. 192—4)

This invention relates broadly to alternating current motors that are typified as being self-starting synchronous motors and more particularly to the directional drive control to insure that said motor always starts in the same direction.

A synchronous motor of the self-starting type may rotate in either direction unless it is provided with some control means to insure that it starts only in one direction. There are a number of control devices in the prior art which basically permit the rotor of the motor to start in either direction and, broadly, if the motor starts in the wrong direction, arresting will take place and the rotor will be caused to move in the other direction. One of the more popular types of directional controls in use relies upon the principle of rebound of part, that is, when one part strikes another, there will be a natural rebound even though these parts are metallic. Occasionally with the rebound directional control it is apparent that it is subject to extreme wear and sometimes it fails to perform in a satisfactory fashion causing the motor to effectively stall out or fail to start in the desired direction. It is accordingly an object of the present invention to provide a directional drive control for a self-starting synchronous motor that provides a positive spring action to throw the rotor in the proper rotational direction.

It is another object of the present invention to provide a self-starting synchronous motor with a directional drive control which builds up additional force upon engagement of the rotor part with the control and insures a positive action for starting.

A still further object of the present invention is to provide a self-starting synchronous motor with a directional drive control in which the means to achieve directional control consists of a ratchet-pawl type of arrangement that is spring loaded so that not only is maximum rebound provided by the spring but also the spring achieves the proper ratchet action.

With these and other objects in view, the invention consists of certain novel features of construction as will be more fully described and particularly pointed out in the appended claims.

Figure 1:
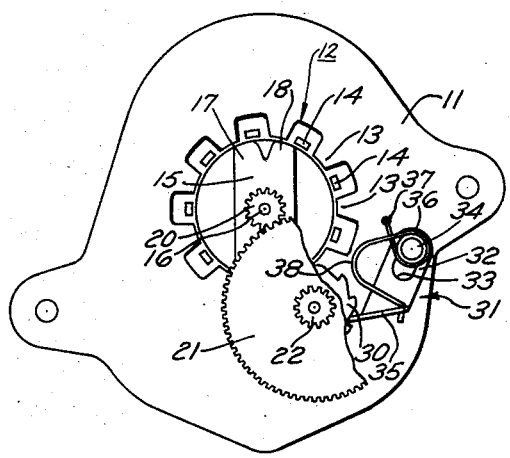
FIG. 1 is a bottom view of a synchronous motor having one form of drive control embodying the present invention.

Referring now to the drawings, 10 designates a housing for a synchronous alternating current motor which is provided with a bottom plate 11 which is preferably made from a non-permanent magnetic material as it forms part of the field of the motor. Accordingly, to operate in this fashion and form part of the field, a central portion of this plate 11 is apertured as indicated generally at 12 with a plurality of portions such as 13 which form field poles. As is well understood by those skilled in the art, a suitable field coil is mounted within the casing 10 and additionally another set of field poles 14 which alternate with the field poles 13 are provided, and the arrangement is such that the alternating current being fed to the motor provides alternating polarity in the poles 13 and 14. To cooperate with these field poles, a rotor 15 is mounted on a shaft 16, and the rotor is provided with a pair of pole sections 17 and 18 which cooperate with the field poles previously mentioned and permit the device to be of the self-starting type. The motor shaft 16 carries a pinion gear 20 which meshes with a driven gear 21 that is suitably journalled in the plate 11 and which has mounted integrally therewith an output pinion 22.

Figure 2:
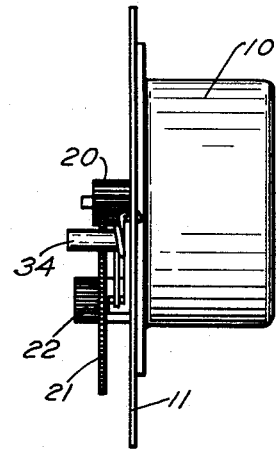
FIG. 2 is a side view of the same motor.

The uni-directional drive control in accordance with the embodiment of FIGS. 1 and 2 comprises a ratchet wheel 30 and a stop element generally designated 31. The stop element consists of a plate 32 which is provided with an elongated aperture 33 through which a mounting post 34 extends. The plate 32 has a pawl part 35 extending from the end thereof and into normal engagement with the ratchet element 30. This engagement is normally maintained by virtue of the spring element 36 which is a wire member anchored at one end in an aperture 37 and then wound around post 34 in a counter-clockwise direction, then extending into an arch as at 38 to terminate at the pawl part 35. By virtue of the spring wire being wound around the post 34, the entire plate is urged in a clockwise direction as viewed in the drawing against the ratchet element 30.

To explain the action of the directional drive control, let us assume that the field coil has just been energized and the motor wants to start in the wrong direction; that is, the gear 21 wants to revolve in a counterclockwise direction, or the rotor wants to revolve in a clockwise direction. When this occurs, a tooth on the ratchet element 30 will engage the pawl 35 and force the plate 32 upwardly as viewed in the drawing, the plate sliding through the aperture 33. As this occurs, it will tend to bow the spring element 36 at the bend 38, and this particular portion of the spring having been compressed will, in effect, increase the spring force being exerted at the ratchet arm 35. Thus when the plate 32 has moved to its maximum limit along the aperture 33, the entire motor will come to rest, and at this point the force being exerted by the spring 36 will be sufficient to force the entire mechanism in the other direction so that the gear 21 will rotate clockwise and the rotor 15 will rotate counterclockwise, thus starting the motor in the proper direction. As this occurs, of course, the plate 32 slides under urgence of the spring 36, and as rotation of the ratchet element 30 takes place, the pawl 35 will merely be harmlessly cammed out of the way by virtue of the teeth. It will accordingly be seen that the spring element 36 effectively serves two functions, the first being that of maintaining the pawl element 35 against the ratchet element 30 and the second being to impart to the ratchet element 30 and the entire gear train, including the rotor of the motor, a sufficient force to reverse the entire device.

Figure 3:
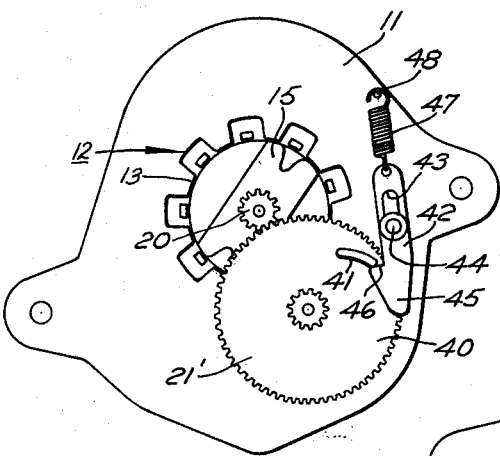
FIG. 3 is a view similar to FIG. 1 showing a modified form of drive control.
Figure 4:
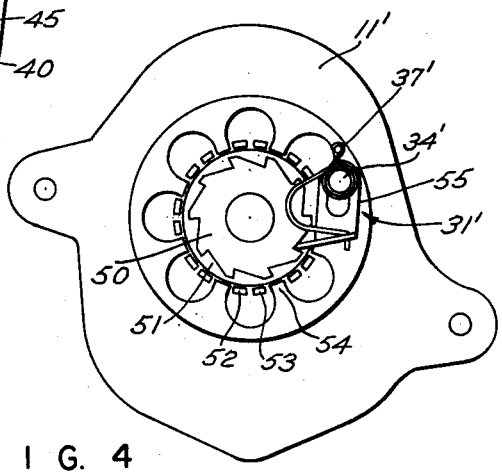
FIG. 4 is another view similar to FIG. 1 of a further modified form of directional drive control applied directly to the rotor of the synchronous motor.

In FIG. 3 another form in which the reversing device may take is shown as here comprising a gear output member 40 which has mounted thereon a ratchet tooth 41. Cooperating with the tooth 41 is a pawl 42 which is provided with an aperture 43 through which a post 44 extends so that the pawl can slide back and forth on this post. Pawl 42 also has a pointed end as at 45 with a shoulder as at 46 which engages the tooth 41. The other end of the pawl 42 is coupled to a coil spring 47 that is anchored on a pin 48 attached to the bottom plate 11.

Here as in the previous embodiment a double action is secured by the virtue of the spring 47 being coupled to the pawl 42, and to appreciate this operation, let us assume that the gear 21' is being driven in a reverse direction, that is, in a clockwise direction as viewed in the drawing, whereupon the tooth 41 will engage the shoulder 46 and force the pawl 42 in a direction whereby the spring 47 will be extended and the pawl will move over the post 44 to the limit of the aperture 43. At this point the entire motor comes to rest, and the force of the spring 47 is sufficient to impart considerable velocity to the mechanism and start the motor in the proper direction. Once the motor is started in the proper direction, the tooth 41 will come around and strike the inclined surface on the end 45 of the pawl, harmlessly ratcheting it out of the way, and in this connection it will be noted that the spring 47 due to its point of anchoring relative to the post 44 orients the pawl in a fashion so that ratcheting is secured. To this end, therefore, the spring operates as a flexible device permitting the pawl to rotate about the post 44.

The type of arrangement that has been disclosed in the two embodiments discussed above may be further modified by having a motor with a gearless output or one in which the uni-directional drive control is placed directly upon the rotor itself and the gear train located at the upper end of the motor housing as is sometimes customary in certain synchronous motor drives. To this end, therefore, the rotor of this modified type of motor will be provided with a ratchet plate 50 which will be directly attached thereto and turn in unison with the rotor 51. To this end, therefore, adjacent the rotor 51 there is provided the usual field poles such as at 52, 53 and 54 for example, which sequence is repeated around the circumference of the rotor 51, and the pole 54 is in effect a part of the casing enclosing the field coil so that upon the upper surface thereof as at 55 there is mounted a ratchet element generally designated 31' that is identical in construction to that disclosed in FIG. 1 and is mounted on a post 34' which extends from the surface of the field enclosure. The end of the spring, as in the embodiment of FIG. 1, is anchored as at 37', and the operation of the device is identical to that disclosed in FIG. 1 and will not be repeated here.

I claim:

1. A directional drive control for a self-starting synchronous motor having a rotor comprising a wheel part having at least a ratchet tooth part driven by said rotor, a cooperating pawl part, said pawl part normally overriding said ratchet tooth part during normal drive of said rotor, mounting means for said pawl part, said mounting means slidably and rockably guiding said pawl part toward and away from said ratchet tooth part and including a positive stop restricting sliding motion away from said ratchet tooth part and spring means rectilinearly and rotationally urging said pawl part toward said ratchet tooth part, said parts being coordinated whereby the pawl part will override the ratchet tooth part during normal drive in the right direction but will engage one of the ratchet teeth on a wrong direction start and slide into engagement with the positive stop, said spring means being biased during the sliding motion and the assembly inducing reversal of the ratchet tooth part.

2. A directional drive control as in claim 1 wherein said pawl part has an elongated aperture and said mounting means includes a pivot pin passing through said aperture, said spring means normally maintaining one end of the aperture against the pin and upon engagement with one of the ratchet teeth will move the pawl so that the pin is at the other end of the aperture.

3. A directional drive control as in claim 1 wherein said spring means is a one-piece member anchored at one end to a portion of the motor housing and the other end to the pawl.

4. A directional drive control as in claim 1 wherein said spring means includes a large arched portion between a point on the motor housing and the ratchet-engaging end of the pawl.

References Cited by the Examiner
UNITED STATES PATENTS

| 1,636,324 | 7/27 | Reed | 192—149 |
| 2,722,615 | 11/55 | Morganson | 310—41 |
| 2,788,455 | 4/57 | Kohlhagen | 192—4 |
| 2,960,201 | 11/60 | Berg | 192—4 |
| 3,112,818 | 12/63 | Woolley | 192—4 |

FOREIGN PATENTS

| 625,395 | 6/49 | Great Britain. |

DAVID J. WILLIAMOWSKY, *Primary Examiner.*